United States Patent
Tanaka et al.

[15] 3,671,507
[45] June 20, 1972

[54] METHOD FOR POLYMERIZATION OF N-VINYLCARBAZOLE

[72] Inventors: Tetsuo Tanaka, Kasukabe; Masao Masumura, Tokyo; Akihiro Toguchi, Tokyo; Nario Yamaguchi, Tokyo, all of Japan

[73] Assignee: Kabushiki Kaisha Ricoh, Tokyo, Japan

[22] Filed: July 12, 1971

[21] Appl. No.: 161,884

Related U.S. Application Data

[63] Continuation-in-part of Ser. No. 813,339, April 3, 1969, abandoned.

[52] U.S. Cl. .................260/88.3 R, 260/33.8, 260/885
[51] Int. Cl. ............................................C08f 7/16
[58] Field of Search ..............................260/88.3 R

[56] References Cited

UNITED STATES PATENTS 2,072,465  3/1937  Reppe et al. .........................260/88.3
2,877,216  3/1959  Fikentscher et al. ................260/88.3
3,037,861  6/1962  Hoegl et al. .........................260/88.3
3,445,439  5/1969  Cornish ...............................260/88.3
3,485,624  12/1969 Thiebaut et al. ....................260/88.3

Primary Examiner—Harry Wong, Jr.
Attorney—Woodhams, Blanchard and Flynn

[57] ABSTRACT

N-vinylcarbazole is bead polymerized in a polymerization reaction mixture made by mixing (1) molten monomer of N-vinylcarbazole suspended in water with a dispersant and (2) a solution of a free radical catalyst in sufficient water insoluble organic solvent to maintain the catalyst and a substantial amount of monomer in suspended droplet form, said solvent having a specific gravity of 1.0 or more; and then agitating vigorously the mixture of (1) and (2) at a temperature above the melting point of N-vinylcarbazole in an inert atmosphere.

6 Claims, No Drawings

METHOD FOR POLYMERIZATION OF N-VINYLCARBAZOLE

CROSS-REFERENCE TO RELATED APPLICATION

This application is a continuation-in-part of United States Ser. No. 813,339, filed Apr. 3, 1969, and now abandoned.

BACKGROUND OF THE INVENTION

1. Field of the Invention

This invention relates to an improved method of polymerizing N-vinylcarbazole.

2. Description of the Prior Art

Bead-type polymerization of N-vinylcarbazole using free radical catalysts is known, and an example of this technology is found in U.S. Pat. No. 2,877,216, where a method is described of suspending N-vinylcarbazole in water with a protective colloid in the presence of an organic peroxide and an azo compound as catalysts. This produces a polymer with a maximum $k$ value of about 120, corresponding to a critical viscosity of less than about 0.30 (in monochlorobenzene at 30°C).

It has become important to produce polyvinylcarbazole (poly-N-vinylcarbazole) with a higher degree of polymerization than heretofore was produced in a practical manufacturing process. This is owing to the superior dielectric properties of poly-N-vinylcarbazole and its further characteristic of retaining this property at high temperatures. It is in demand for use as a molding material for making electrical insulator products. Recent knowledge has opened further new demands for its use in the fields of photoconductive materials for use in electrophotography. The properties of the higher molecular weight polymers, i.e., higher mean degree of polymerization, render them most suitable to those uses.

When polyvinylcarbazole is made by prior methods such as those of the aforesaid patent, either by direct heating or the use of a suspension, using, for example, an organic peroxide catalyst, no polymer of the desired high mean polymerization degree is obtained and, even when using a nitrogen atmosphere, the critical viscosity ($\eta$) of the product is 0.5 as a maximum (in chlorobenzene at 30°C).

When the polymerization reaction according to prior methods is conducted under reduced pressure, the critical viscosity can be raised to about 1.1. However, this procedure requires special equipment and is attended by unfavorable costs and production problems.

SUMMARY OF THE INVENTION

This invention provides a process of polymerizing N-vinylcarbazole to produce a polymer having a critical viscosity of 1.0 or above by a novel and facile method. N-vinylcarbazole is suspended in water, preferably in the molten state, with the aid of a dispersant. This suspension, at a temperature sufficiently high to maintain the monomer molten, is mixed with a solution of a free radical catalyst dissolved in a water insoluble organic solvent to provide a polymerization reaction mixture containing droplets of organic solvent which have the catalyst and some N-vinylcarbazole dissolved therein. This polymerization reaction mixture is agitated, as by stirring sufficiently to achieve physical contact between the suspended monomer and the droplets. The polymerized product is macromolecular poly-N-vinylcarbazole particles having a particle diameter of from 0.1 to 5 mm and a critical viscosity of at least 1.0.

It has been found, according to this invention, that N-vinylcarbazole, bead polymerized by the above method, produces a macromolecular polymer that is readily recoverable. The amount of water insoluble organic solvent is that which is sufficient to dissolve the catalyst and also, as the polymeric product is formed, to dissolve from the surrounding suspension further substantial quantities of the monomer. We have found that the lower limit of solvent amount is not critical, but practical reaction speeds can be attained if the solvent is not less than 0.5 percent based on the weight of N-vinylcarbazole.

The upper practical limit of solvent amount is such that it should be less than 50 percent based on the weight of N-vinylcarbazole, since using more solvent tends to interfere with polymer dispersion and tends to cause excessive polymer coagulation.

Hence, a transparent bead polymer can be prepared by melting a monomer in water, e.g., about 70° C, adding a dispersant causing a dispersion to form and then introducing into the resulting dispersion a solution of a polymerization catalyst dissolved in an organic solvent and carrying out the polymerization by maintaining this reaction mixture at a temperature above the melting point of the monomer while vigorously stirring it in an inert atmosphere.

The product can be removed easily from the system, even during agitation, by means of a wire screen or gauze of proper mesh size. It dries readily as it does not contain the quantities of solvent as in the case of conventional solution polymerization.

It has been discovered that, in addition to its other obvious uses, poly-N-vinylcarbazole prepared in this manner, having inherently a critical viscosity of 1.0 or more and a particle diameter of about 0.1 to 5.0 mm, and being of macromolecular character, it provides a very thin strong film coating when applied to the surface of a support for a photoconductive material, and is further superior for this purpose because it provides extremely satisfactory image properties.

N-vinylcarbazole can also be introduced into water in a reaction vessel where the temperature is maintained above the melting point of the monomer (63°–64° C). The solution of the organic solvent containing the catalyst then is added. The monomer may settle to the bottom of the vessel under quiescent conditions. Slow but continuous agitation, as by slow or moderate stirring, can be applied to the mixture, and then a dispersant for the monomer added. When the monomer becomes dispersed, the above-described conditions of polymerization can be established and maintained, the product being a transparent bead polymer having the above-described properties.

The same product can also be prepared by introducing the monomer into water containing the dispersant and kept at a temperature above the melting point of the monomer, adding to the dispersion the solution of catalyst and maintaining the mixture at the polymerizing conditions above mentioned.

As a variation of procedure within the scope of this invention, the quantity of solvent can be increased at the time of adding catalyst, up to 50 percent based on the total monomer for the purpose of producing beads associated with solvent. This is desirable when the bead is subsequently to be dissolved in a suitable solvent for further processing.

The amount of water insoluble solvent, as previously described is in the range of 0.5 to 50 percent based on the total monomer used. These limits are not technologically critical, but are preferred for practical reasons, also as described above.

The solvent should be selected so that its specific gravity is 1.0 or more, and is one which will dissolve the N-vinylcarbazole monomer and the polymerization catalyst, but not the macromolecular polymer. Preferred solvents are monochlorobenzene, ortho-dichlorobenzene, meta-dichlorobenzene, para-dichlorobenzene, 1,2-dichloroethane and 1,1-dichloroethane.

Suitable dispersants are talc, zinc oxide, polyvinyl alcohol, carboxymethyl cellulose, casein, starch, bentonite, inorganic salts such as calcium phosphate; or mixtures of these substances. The quantity can be in the range of 0.1 to 5.0 weight percent based on total N-vinylcarbazole.

Suitable polymerization catalysts are such radical formers as an organic peroxide such as benzoyl peroxide, azobisisobutyronitrile and the like, used in the range of 0.01 to 1.0 weight percent based on total N-vinylcarbazole.

DESCRIPTION OF THE PREFERRED EMBODIMENTS

Example 1

This is a comparison example wherein a poly-N-vinyl-carbazole made (A) in accordance with the invention and a poly-N-vinylcarbazole made (B) in accordance with the above-mentioned prior patented process are each prepared and their relevant properties compared, for the purpose of providing a more complete understanding of the superiority of the products made by (A).

Example (A)

Poly-N-vinylcarbazole was prepared, according to the procedure of this invention as follows: Two and one-half kilogram of pure water was placed in a 5 l. polymerization vessel fitted with a stirrer, to which 0.5 kg. of N-vinylcarbazole was added. Five grams of wheat starch was added, and the reaction mixture was heated to 70° C at which temperature the monomeric N-vinylcarbazole was molten. A solution prepared by dissolving 0.5 g. of azobisisobutyronitrile in 50 cc. of orthodichlorobenzene was added to the reaction mixture by means of a pipette, and the reaction mixture was stirred slowly until a uniform mixture was obtained consisting of a dispersion of N-vinylcarbazole in wheat starch suspension and a droplet phase of the solvent solution of catalyst containing dissolved monomer. The temperature then was raised to 90° C and the polymerization reaction was conducted while rotating the stirrer at 350 r.p.m. for 5 hours during which time nitrogen gas was introduced to provide an inert atmosphere. At the end of the polymerization reaction, transparent bead-like polymer particles having a particle diameter of about 2 mm were obtained.

Comparison Example (B)

A comparative product according to U.S. Pat. No. 2,877,216, was prepared following the procedure of Example 5 of the patent, wherein each material was utilized in the quantity of one-twentieth that in Example 5, that is:

1.0 l. of water (the pH of which was made 9.2 by the addition of 0.48 g. of NaOH, 1.55 g. of $H_3BO_3$ and 1.86 g. of KCl)
500 g. of monomeric N-vinylcarbazole,
2.5 g. of sodium polyacrylate,
0.5 g. of azo-di-isobutyronitrile, and
1.0 g. of di-tertiary-butyl peroxide were placed in a glass flask and stirred at 75° C for 24 hours. Thereafter the charge in the flask was poured into an autoclave preheated to 90° C, sealed hermetically, and maintained at a temperature of 130° C for 2 hours while stirring. The charge was dissolved in monochlorobenzene and thereafter was poured into a large quantity of methanol to thereby obtain precipitated polymer.

Test Methods for Comparison

1. Yield

The yield of poly-N-vinylcarbazole of (A) and (B) was calculated by the following formula, $$\frac{\text{Weight of methanol insoluble residue}}{\text{Weight of Sample}} \times 100$$

2. Critical Viscosity:

Poly-N-vinylcarbazole (methanol insoluble residue) was dissolved in monochlorobenzene, and the critical viscosity ($\zeta$) was determined at 30° C by means of Ubbelohdes viscometer.

Tabulated Comparison Results:

| | Yield (%) | Critical viscosity ($\zeta$) |
|---|---|---|
| A | 97 | 1.31 |
| B | 90 | 1.03 |

Analysis of Comparison Results

From the above results, the poly-N-vinylcarbazole obtained according to the method of our invention (A) is 0.28 higher in critical viscosity than that made according to the method of the patent (B). In addition, the method of (A) is superior by 7 percent in yield of poly-N-vinylcarbazole compared with that of (B) the prior patent.

The method of our invention (A) thus possesses decided superiority in yield and degree of polymerization and it is significant technically and economically that to obtain, in 90 percent yield, the poly-N-vinylcarbazole of (B), an extended polymerization reaction time at high temperature and pressure are needed.

Example 2

Two and one-half kilogram of pure water was weighed into a 5 l. polymerization vessel, wherein 1.0 kg. of N-vinylcarbazole was added. Five gram of bentonite and 5 g. of calcium phosphate were added as a dispersant, and the mixture was then heated to 70° C to melt the monomer. Two gram of azobisisobutyronitrile was dissolved in 300 cc. of 1,2-dichloroethane, after which the solution was added to the dispersion of the melted monomer in the water with a pipette, while stirring was conducted to produce a uniform mixture. The temperature was raised to 80° C and the polymerization reaction was continued for 5 hours with stirring at the rate of 300 r.p.m., nitrogen gas being introduced into the vessel during this time. When the polymerization was over, a pearly polymer whose particles had a diameter of about 5 mm was obtained.

In this example, the polymer was obtained in good yield of 96 percent, and had a critical viscosity of 1.29. The polymer also showed that it could be easily dissolved in a solvent, for example, 1,2-dichlorethane in half the time which polyvinylcarbazole, having the same critical viscosity and not containing any said solvent, required for resolution thereof.

Example 3

Two and one-half kilogram of pure water was placed in a 5 l. polymerization reaction vessel and 1.0 kg. of N-vinylcarbazole was added. The mixture was heated to the temperature of 70° C in order to melt the monomer.

A polymerization catalyst solution was prepared by dissolving 1.0 g. of di-tert-butylperoxide in 50 cc. of monochlorobenzene. While dispersing the aforementioned monomer in the water with stirring at the rate of 200 r.p.m., the solution containing the polymerization catalyst was added. Ten minutes later, 40 g. of talc was added as a dispersant and the temperature was raised to 97° C. Polymerization was conducted for 2 hours in the atmosphere of nitrogen gas, and a pearly polymer, whose particles had a diameter of about 5 mm, was obtained.

The yield at that time was as high as 97 percent and the critical viscosity was 1.77. The polymer was dissolved in monochlorobenzene and was coated on the surface of an aluminum plate, thus a photoconductive plate suitable for use in electrophotography and having an excellent film-forming and surface-finishing properties was obtained.

The embodiments of the invention in which an exclusive property or privilege is claimed are defined as follows:

1. A method of polymerizing N-vinylcarbazole in aqueous suspension, which comprises:

forming a mixture of (1) molten N-vinylcarbazole monomer, (2) a dispersing agent and (3) water, with the temperature of the water being above the melting point of said monomer, said mixture containing from 0.1 to 5 percent by weight of dispersing agent, based on the weight of said monomer;

adding to said mixture (4) a solution consisting of free radical catalyst dissolved in a solvent selected from the group consisting of chlorobenzene, dichlorobenzene and dichloroethane, said solvent being present in the resulting suspension in an amount of from 0.5 to less than about 50 percent by weight, based on the weight of said monomer, and the catalyst being present in the resulting suspension in an amount in the range of from 0.01 to 1.0 percent by weight, based on the weight of said monomer;

vigorously stirring the suspension while maintaining the temperature thereof higher than the melting point of said monomer and in an inert atmosphere until polymerization is completed.

2. A method according to claim 1, in which said dispersing agent is selected from the group consisting of talc, zinc oxide, polyvinyl alcohol, carboxymethyl cellulose, casein, starch, bentonite and inorganic salts.

3. A method according to claim 1, in which said free radical catalyst is selected from the group consisting of benzoyl peroxide, azobisisobutyronitrile and di-tert-butyl-peroxide.

4. A method of polymerizing N-vinylcarbazole, which comprises forming a suspension mixture of (1) molten N-vinylcarbazole monomer and (2) water, with the temperature of the water being above the melting point of said monomer;

adding to the mixture (3) a solution of free radical catalyst dissolved in a solvent selected from the group consisting of chlorobenzene, dichlorobenzene and dichloroethane, said solvent being present in the resulting suspension in an amount of from 0.5 to less than about 50 percent by weight, based on the weight of said monomer, and the catalyst being present in the resulting suspension in an amount in the range of from 0.01 to 1.0 percent by weight, based on the weight of said monomer;

adding to the suspension (4) a dispersing agent in an amount of from 0.1 to 5 percent by weight, based on the weight of the monomer;

then vigorously stirring the suspension while maintaining the temperature thereof higher than the melting point of said monomer and in an inert atmosphere until polymerization is completed.

5. A method according to claim 4, in which said dispersing agent is selected from the group consisting of talc, zinc oxide, polyvinyl alcohol, carboxymethyl cellulose, casein, starch, bentonite and inorganic salts.

6. A method according to claim 4, in which said free radical catalyst is selected from the group consisting of benzoyl peroxide, azobisisobutyronitrile and di-tert-butylperoxide.

* * * * *

UNITED STATES PATENT OFFICE
CERTIFICATE OF CORRECTION

Patent No. 3,671,507　　　　　　　　　　Dated June 20, 1972

Inventor(s) Tetsuo Tanaka, Masao Masumura, Akihiro Toguchi and Mario Yamaguchi

It is certified that error appears in the above-identified patent and that said Letters Patent are hereby corrected as shown below:

Column 1; add ---Claims priority, application Japan, filed April 12, 1968, Serial No. 43-24637.---

Signed and sealed this 19th day of December 1972.

(SEAL)
Attest:

EDWARD M. FLETCHER, JR.　　　　　　　ROBERT GOTTSCHALK
Attesting Officer　　　　　　　　　　　Commissioner of Patents